(12) United States Patent
Jeremic

(10) Patent No.: US 8,476,332 B2
(45) Date of Patent: Jul. 2, 2013

(54) INKJET PRINTING

(75) Inventor: Natasha Jeremic, Royston (GB)

(73) Assignee: Xennia Technology Limited, Hertfordshire (GB)

( * ) Notice: Subject to any disclaimer, the term of this patent is extended or adjusted under 35 U.S.C. 154(b) by 1040 days.

(21) Appl. No.: 12/513,193

(22) PCT Filed: Nov. 9, 2007

(86) PCT No.: PCT/GB2007/004301
§ 371 (c)(1),
(2), (4) Date: May 1, 2009

(87) PCT Pub. No.: WO2008/056172
PCT Pub. Date: May 15, 2008

(65) Prior Publication Data
US 2010/0068407 A1    Mar. 18, 2010

(30) Foreign Application Priority Data

Nov. 9, 2006   (GB) .................................. 0622284.8

(51) Int. Cl.
*C09D 11/10*    (2006.01)
*B32B 3/10*     (2006.01)
*B05D 5/00*     (2006.01)

(52) U.S. Cl.
USPC ........................... 522/84; 427/256; 428/195.1

(58) Field of Classification Search
USPC ........................... 522/84; 428/195.1; 427/256
See application file for complete search history.

(56) References Cited

U.S. PATENT DOCUMENTS

| | | | |
|---|---|---|---|
| 5,641,346 A | 6/1997 | Mantell et al. | 106/31.58 |
| 5,889,084 A | 3/1999 | Roth | 523/161 |
| 2006/0158493 A1 * | 7/2006 | Nakano et al. | 347/96 |
| 2007/0247503 A1 * | 10/2007 | Fukawa et al. | 347/100 |

FOREIGN PATENT DOCUMENTS

| | | |
|---|---|---|
| EP | 0 071 345 | 2/1983 |
| EP | 1 491 600 | 12/2004 |
| WO | WO 00/34400 | 5/2000 |
| WO | 02/053659 A2 | 7/2002 |

\* cited by examiner

*Primary Examiner* — Vu A Nguyen
(74) *Attorney, Agent, or Firm* — Morgan, Lewis & Bockius LLP

(57) ABSTRACT

A single phase curable composition for use in inkjet printing, comprising at least one cationically curable material, at least one cationic photoinitiator and water together with a method of inkjet printing such compositions is provided.

24 Claims, No Drawings

INKJET PRINTING

This application is a 371 filing of PCT/GB2007/004301 (WO 2008/056172), filed Nov. 9, 2007, claiming priority benefit of GB 0622284.8, filed Nov. 9, 2006.

FIELD OF THE INVENTION

The invention relates to curable inkjet compositions, particularly those suitable for use in thermal inkjet printing.

BACKGROUND TO THE INVENTION

Inkjet printing processes fall into two main types: continuous processes and drop-on-demand (DOD) processes. Continuous processes use electrically conductive inks to produce a stream of drops electrically charged ink that are deflected by an electric field to an appropriate location on a substrate. In DOD processes, individual drops of ink are expelled from the nozzle of a print head either by vibration of a piezoelectric actuator (in piezoelectric inkjet printing) or by heating the ink to form a bubble (in thermal inkjet printing, also known as bubblejet printing). Thermal inkjet printing has advantages over piezoelectric printing, with printers and print heads being lower cost and with the printing process being able to achieve better resolution.

Inkjet inks need to satisfy a number of requirements, including the following:

Viscosity must be appropriate. With DOD inks there are greater limitations on inks for thermal printing than for piezoelectric printing, with it generally being necessary for inks to have a viscosity of below 4 mPa·s at print head operating temperature (which is typically 40-50° C.), which usually equates to a viscosity of less than 10 mPa·s at a temperature of 25° C., to be capable of being thermally inkjet printed. In this specification, all viscosity values are at 25° C. unless otherwise specified.

The ink must not cause unacceptable levels of clogging or blockage of printing nozzles.

The ink must not result in build up of deposits on the ejection heaters of thermal inkjet print heads (a process known as kogation) to an unacceptable level during the working life of a print head.

The ink should be stable in storage, without settling out or coagulation of materials.

The resulting print needs to satisfy desired characteristics depending on the field of use, with possible relevant factors including waterfastness, scratch resistance, durability, lack of shrinkage, lack of cracking, flexibility, optical density (for coloured inks), uniformity of deposition.

In addition inks suitable for use in thermal inkjet printing must also comprise a volatile solvent which vapourises in use to form bubbles of ink. Water is often chosen as such a solvent as it has a low viscosity and carries no ignition risk.

Radiation-curable inks are known and provide a greatly superior printing result than for non-curable inks. These typically comprise one or more monomers etc. curable in response to appropriate conditions, typically ultraviolet (UV), infra red (IR), microwave or heat.

Two main ways by which curing can be achieved are by a free radical mechanism and by a cationic mechanism. Curing by the free-radical mechanism suffers from a number of drawbacks, such as oxygen inhibition and poor adhesion on difficult (e.g. low surface energy) substrates, which the cationic mechanism does not suffer from.

Additionally curing by the cationic mechanism also offers a number of advantages including:
excellent adhesion to a variety of substrates (metals, plastics, glass and ceramics)
very good dimensional stability (low shrinkage)
low viscosity
excellent toughness
no oxygen inhibition and high curing rates in air
formable coatings
post cure effect beneficial for reaching full cure and optimum properties.

However, it is known that water can prevent or inhibit the cationic curing process. Inkjet inks which are cationically curable are therefore typically free of water.

Other major practical difficulties can arise when formulating curable inks comprising water. For example, cationically- and free-radically-curable monomers and oligomers tend to have limited solubility in water, and may undergo undesirable phase separation unless care is taken.

WO 2006/056781 discloses curable inks for use in inkjet printing having a viscosity less than 100 mPas, which contain cycloaliphatic epoxy compounds, oxetane monomers, hydroxy-containing compounds and optionally an allyl/vinyl ether monomer, together with at least one cationic photoinitiator, among other ingredients. The exemplified inks have viscosities in the range 91.7 to 19.0 mPas at 25° C. The compositions are water-free.

US 2005/0171237 discloses a cationically curable composition, suitable for use in piezoelectric inkjet printing, comprising a low viscosity reactive resin comprising an oxetane and a cyloaliphatic epoxy resin, in combination with a higher viscosity reactive resin of similar composition. The compositions are substantially non-aqueous.

US 2005/0090580 discloses an ink for inkjet recording comprising oxetanes and aliphatic epoxy compounds, see paragraph 75). The compositions are curable by a cationic mechanism. It is generally desired that the composition is prepared so as not to contain any volatile component such as water and organic solvents.

US 2004/0166253 concerns inkjet inks suitable for use in piezoelectric inkjet printing, where the viscosity of the ink is reduced and has good performance under high humidity conditions. The composition comprises an alicyclic epoxy material, an oxetane and optionally a vinyl ether. The composition, does not contain water.

SUMMARY OF THE INVENTION

In a first aspect, the invention provides a single phase curable composition for use in inkjet printing, comprising at least one cationically curable material, at least one cationic photoinitiator and water.

Such compositions provide some or all of the advantages of water-free compositions but with the additional advantages associated with water being present, such as low viscosity and allowing the compositions to be safely used in thermal inkjet printing.

The compositions of the invention are used in conventional manner, e.g. using a thermal inkjet printer. The compositions are printed onto the intended substrate and exposed to an appropriate curing regime depending on the nature of the curable materials, e.g. involving exposure to UV light, heat, etc. A drying step may also be required, e.g. using exposure to microwaves.

The compositions may be printed onto a variety of substrates, and find particular use with non-porous and semi-porous substrates such as metals, metallized films, glass, plastics (e.g. polyesters such as polyethylene terephthalate (PET), low density (LD) polyethylene, and orientated polystyrene, high density (HD) polyethylene, polypropylene, polyvinyl chloride (PVC), polycarbonate, polyimide film etc.

Even on difficult to handle non-porous substrates, the invention can provide compositions that are fast drying and produce good quality prints of high durability. In particular, the resulting prints may satisfy the requirements of good scratch resistance, wetfastness, flexibility and optical density (for coloured inks). The compositions find particular application in industrial printing onto non-porous substrates.

When the ink composition is applied to non-porous substrates using an inkjet printing system, permanent images are produced having excellent adhesion to non-porous substrates.

The term "single phase" is used to mean that the curable materials are fully in solution, being dissolved in water and co-solvent or being fully miscible therewith. No phase separation or settlement occurs. The single phase composition may nevertheless optionally carry other materials in solid form to achieve required application properties. For instance, the ink compositions of the present invention can optionally comprise dye or pigment. A dye is a colorant, which is dissolved in the carrier medium, while a pigment is a colorant that is insoluble in the carrier medium, but is dispersed or suspended in the form of small particles, often stabilized against flocculation and settling by the use of dispersing agents.

The compositions according to the invention may contain a wide range of water levels, such as from 2 to 50 wt % of the composition. However, care must be taken that levels are not so low that overheating occurs when thermally printed or that levels are not so high that phase separation occurs. Water levels are preferably in the range of from 5 to 40 wt %, more preferably 10 to 30 wt % of the composition.

As discussed above, DOD inkjet inks must have low viscosities in order to perform to acceptable standards. This is particularly the case for thermally printed inks. Viscosities are desirably from 1 to 100 mPas, preferably from 2 to 50 mPas, more preferably from 3 to 30 mPas, and most preferably from 5 to 10 mPas.

As would be understood by a person skilled in the art, "curable" refers to functionality directly or indirectly pendant from a surface-treated particle, monomer, oligomer, polymer, or other constituent (as the case may be) that participate in polymerization and/or crosslinking reactions upon exposure to a suitable source of curing energy. Such functionality generally includes not only groups that cure via a cationic mechanism upon energy exposure but also groups that cure via a free-radical mechanism. Representative examples of radiation-curable groups suitable in the practice of the present invention include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like.

The energy source used for achieving polymerization and/or crosslinking of the curable materials may be actinic (e.g. radiation having a wavelength in the ultraviolet or visible region of the spectrum), accelerated particles (e.g., electron beam radiation), thermal (e.g. heat or infrared radiation), or the like. Preferably, the energy is actinic radiation, because such energy provides excellent control over the initiation and rate of polymerization and/or crosslinking. Additionally, actinic radiation can be used for curing at relatively low temperatures. This avoids degrading or evaporating components that might be sensitive to the relatively high temperatures that might be required to initiate polymerization and/or crosslinking of the energy curable groups when using thermal curing techniques. Suitable sources of curing energy include lasers, electron beams, mercury lamps, xenon lamps, carbon arc lamps, tungsten filament lamps, sunlight, low intensity ultraviolet light (UV), and the like. The use of UV light for polymerization tends to form higher molecular weight polymers as compared to many other kinds of curing energy. Accordingly, when it is desired to faun higher molecular weight materials upon curing, the use of UV light is preferred.

The cationically curable materials harden on curing following exposure to a suitable curing stimulus e.g. UV, heat, or infra red (with appropriate initiators being used) after printing to form printed material usually in the form of a film. It will be appreciated that different curable material(s) and mixtures thereof may be better suited for different printing systems, printing applications and/or printing media.

Preferred cationically curable materials are epoxy functional monomers containing one or more epoxy functionalities in the molecule.

Epoxy functional monomers which are cycloaliphatic epoxy functional monomers are particularly preferred.

Suitable cycloaliphatic epoxies include, but are not limited to 3,4-epoxycyclohexylmethyl-3,4-epoxycyclohexane carboxylate (ERL-4421, Union Carbide Corp.), (Cyracure UVR-6105, UVR-6107, UVR-6110, Dow Chemicals), bis-(3,4-epoxycyclohexylmethyl) adipate (Cyracure UVR-6128, Dow Chemicals), 3,4-epoxy-6-methylcyclohexylmethyl-3, 4-epoxy-6-methylcyclohexene carboxylate (ERL-4201™, Union Carbide Corp.), bis(3,4-epoxy-6-methylcyclohexylmethyl) adipate (ERL-4289™, Union Carbide Corp.), bis(2,3-epoxycyclopentyl)ether (ERL-0400™, Union Carbide Corp.), aliphatic epoxy modified with polypropylene glycol (ERL-4050™, ERL-4052, Union Carbide Corp.), dipentene dioxide (e.g., "ERL-4269™" from Union Carbide Corp.), limonene (Aldrich Chemical Co.), limonene monoxide (Arkema Inc.) and limonene dioxide (Arkema Inc.). (Cyracure is a Trade Mark).

The epoxy functional monomers are suitably present in an amount in the range 1 to 60% by weight, preferably 1 to 40% by weight and more preferably 20 to 30% by weight of the composition. However, when optional free radically curable materials are also present the epoxy functional monomers are suitably present in an amount in the range 0-10% by weight, preferably 2-5% by weight of the composition.

Also preferred as cationically curable materials are oxetane functional monomers containing one or more oxetane rings in the molecule.

Suitable oxetanes include, but are not limited to 3-ethyl-3-hydroxymethyl oxetane (OXT-101, Toa Gosei Co., Ltd.), 1,4-bis[(3-ethyl-3-oxetanyl) methoxymethyl]benzene (OXT-121, Toa Gosei Co., Ltd.), 3-ethyl-3-(phenoxymethyl) oxetane (OXT-211, Toa Gosei Co., Ltd.), di(1-ethyl-3-oxetanyl)methylether (OXT-221, Toa Gosei Co. Ltd.) and 3-ethyl-3-(2-ethylhexyloxymethyl)oxetane (OXT-212, Toa Gosei Co., Ltd.), and specifically preferably utilized are 3-ethyl-3-hydroxymethyl oxetane, and di(1-ethyl-3-oxetanyl)methyl ether. These oxetanes can be employed alone or in combinations thereof. (OXT-101, 121, 211, 221 and 212 are Trade Marks). 3-ethyl-3-hydroxymethyl oxetane (OXT-101) is particularly preferred because it has been found to be water tolerant.

The oxetanes are suitably present in an amount in the range 5-50% by weight, preferably 7-40% by weight of the composition. However, when free radically curable materials are also present—the oxetanes are suitably present in an amount in the range 1-20% by weight, preferably 3-15% by weight of the composition.

Allyl and/or vinyl ether monomers may be desirably included into the compositions of the present invention. Such materials provide numerous benefits e.g. being of low viscosity and cure rapidly by both free radical and cationic photoinitiators. Suitable vinyl ether compounds include, but are not limited to vinyl- and divinyl ether compounds such as ethylene glycol divinyl ether, ethylene glycol monovinyl ether, diethylene glycol divinyl ether, triethylene glycol monovinyl ether, triethylene glycol divinyl ether (TEGDVE), propylene glycol divinyl ether, dipropylene glycol divinyl ether, 1,4-butanediol vinyl ether, 1,4-butanediol divinyl ether, hexanediol divinyl ether, cyclohexanedimethanol divinyl ether, hydroxyethyl monovinyl ether, hydroxynonyl monovinyl ether, and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, 4-hydroxybutyl vinyl ether (HBVE), 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether.

Of these vinyl ether compounds, when taking into account viscosity, curability, adhesion properties, and surface hardness, mono-, divinyl or trivinyl ether compounds are preferred, and divinyl ether compounds are specifically preferred. In the present invention, the vinyl ether compounds may be employed individually or in combinations thereof.

Vinyl ethers may be present in an amount in the range 0-40% by weight, preferably 5-30% by weight of the composition. However, when free radically curable materials are also present, the vinyl ethers are suitably present in an amount in the range 0-40% by weight, preferably 2-5% by weight of the composition.

In addition to the compositions comprising cationically curable materials, they may also comprise free radically curable materials and free radical photoinitiators. Such materials are sometimes known in the art as "hybrid" compositions.

Free-radically curable materials useful in the hybrid inkjet ink compositions of the present invention preferably include one or more monofunctional acrylates.

Suitable commercially available free-radically curable materials include the following available from Sartomer: tridecyl acrylate (SR 489™), isodecyl acrylate (SR 395), 2-phenoxy acrylate (PEA) (SR 339C™), lauryl acrylate (SR 335™), 2-(2-ethoxy-ethoxy)ethyl acrylate (EOEOEA) (SR 256™), tetrahydrofurfuryl acrylate (THFA) (SR 285™), and isobornyl acrylate (IBOA) (SR 506D™). Monofunctional acrylates have good solvency, low viscosity, high flexibility and good adhesion to plastic and to difficult substrates.

Good results have been obtained using a monofunctional acrylate, suitably present in an amount in the range 1-15%, preferably in the range 5-8% by weight of the composition.

The free-radically curable materials in the hybrid inkjet ink compositions of the present invention preferably include one or more polyalkene glycol acrylates. Good results have been obtained using alkoxylated trimethylolpropane acrylates, suitably present in an amount in the range 1-15%, preferably in the range 5-8% by weight of the composition.

Good results have been obtained using a mixture of at least one alkoxylated trimethylolpropane acrylate and at least one polyalkene glycol acrylate. Oligomers in the first class have reasonable water solubility and produce printed films with good properties, e.g. in terms of hardness and water resistance, but they have relatively high viscosities. Oligomers in the second class have higher water solubility and lower viscosity, but produce softer, more water sensitive films. By using a mixture of the two classes of oligomers, a good overall balance of properties can be achieved.

The alkoxylated trimethylolpropane acrylate monomer includes acrylates, methacrylates, and also multifunctional (meth)acrylates including di(meth)acrylates, tri(meth)acrylates etc. The number of functionalities affects the properties of the resulting cured films, with higher functionality materials producing films with higher shrinkage, higher water/chemical resistance and better durability. Higher functionality also provides fast cure response: materials with 1 or 2 functional groups usually cure/polymerise slowly and require a greater ratio of initiator and longer exposure to curing conditions. Some of the disadvantages of materials with very high functionality (5 or higher) are that they have high viscosity and they produce films with very high shrinkage and low flexibility. Materials with 3 functionalities increase cross linking density, and chemical resistance and scratch resistance of printed films, but have relatively high viscosities and so should be used sparingly (typically at 1-9% by weight). Tri(meth)acrylates are currently preferred for their balance of properties.

The trimethylolpropane acrylate monomer may be alkoxylated etc. with ethoxylated monomers generally being preferred as they have good water solubility. The extent of alkoxylation affects the water solubility of the monomer, and also the water sensitivity of the resulting printed material, with higher levels of alkoxylation producing more water soluble monomers and more water sensitive prints. It is preferred to use a material with 3 ethylene oxide units (3 EO), possibly in combination with smaller amounts of material with lower levels of ethoxylation, for a good balance of properties. Good results have been obtained with ethoxylated (3 EO) trimethylolpropane triacrylate (EO 3 TMPTA). This material has a fast cure response and low skin irritancy and produces printed films with good properties including good water solvent resistance and lack of brittleness, i.e. good ductility.

Suitable commercially-available materials include the following UV-initiated free-radically curable materials available from Sartomer: SR 351™ (BO TMPTA), SR 454™ (EO 3 TMPTA), SR 492™ (TMPPOTA), SR 499™ (EO6 TMPTA), SR 502™ (EO9 TMPTA), SR 9035™ (EO15 TMPTA), and the ethoxylated triacrylates from Rahn AG: MIRAMER 170™, MIRAMER M3130™. MIRAMER M3160™ and MIRAMER M3190™.

The polyalkene glycol acrylate monomer includes acrylates, diacrylates, methacrylates and also multifunctional (meth)acrylates, including di(meth)acrylates, tri(meth)acrylates etc. Diacrylates are currently preferred. Compared with diacrylates, methacrylates and dimethacrylates have lower viscosities (which is advantageous), but slower cure responses (which is disadvantageous). The polyalkene may be propylene, dipropylene etc., with dipropylene glycols being favoured. The currently preferred material is dipropylene glycol diacrylate (DPGDA). DPGDA has the advantages of low viscosity, low volatility and fast cure speed, flexibility, adhesion, hardness and abrasion resistance.

Suitable commercially available materials include the following UV-initiated free-radically curable materials available from Sartomer: SR 508™ (DPGDA), SR 306™ (TPGDA), SR 238 (HDDA), SR 231™ (DEGDMA), SR 272™ (TEGDA), SR 205™ (TEGDMA), SR 268™ (TetEGDA), and SR 9003™ (PONPGDA), and the UV-initiated free-radically curable materials available from Cytec Industries including, but are not limited to: EBECRYL 114™, EBECRYL 145™ and EBECRYL 152™ etc.

Good results have been obtained with a mixture of 7.14% by weight DPGDA (SR 508™) 7.14% by weight (THFA) (SR 285™), and, 3.57% by weight (EO TMPTA) (SR 454™).

The composition desirably includes one or more curable n-vinyl monomer materials. These generally have low viscosities, and so act to reduce the viscosity of the compositions. The n-vinyl monomers also act as curable humectants, helping jetting stability and printing reliability and preventing drying on the nozzles. They cure in with the epoxy and oxetane monomers, increasing film thickness. Because they cure in they do not have to be removed from the print before or after curing. It is preferred to use n-vinyl acetamide (N-VAM), n-vinyl pyrrolidone (NVP) or n-methyl-n-vinyl acetamide. N-acryloyl morpholine (N-AM) (which is also curable) is a useful material. The combination of n-vinyl acetamide and n-acryloyl morpholine has been found to give good results. The n-vinyl monomer materials, may also function as co-solvent. The n-vinyl monomers are also surprisingly found to be useful in preventing or reducing kogation, and so function as anti-kogation agents. These monomer materials may be used in an amount of up to about 35% by weight of the total weight of the composition, but is typically used at levels of 30% or less.

Viscosity values for various cationically- and free-radically curable materials are given below:

| Chemical Name | Commercial Name | Functionality | Viscosity (mPa·s)@ 25° C. |
|---|---|---|---|
| Triethylene glycol divinyl ether | TEGDVE | 2 | 2.6 |
| 4-Hydroxybutyl vinyl ether | HBVE | 2 | 5.4 |
| 1,4 Butanediol divinyl ether | BDVE | 2 | 4.3 |
| Trimethyloylpropane oxetane | OXT-101 (TMPO) | 1 | 22 |
| 3-Ethyl-3-(2-ethylhexyloxymethyl)oxetane | OXT-212 | 2 | 5 |
| Bis(3-ethyl-3-oxetanylmethyl)ether | OXT-221 | 2 | 12.8 |
| 3,4-Epoxycyclohexylmethyl-3,4-epoxy cyclohexane carboxylate | ERL-4421, UVR-6105 | 2 | 220-250 |
| Limonene monoxide | LMO | 1 | 10 |
| Limonene dioxide | LDO | 2 | 10 |
| n-methyl-n-vinyl acetamide | NM-VAM | 1 | 1.28 @ 20° C. |
| n-vinyl acetamide | NVAM | 1 | solid |
| N-vinyl pyrrolidone | NVP | 1 | 2.4 @ 20° C. |
| N-acryloyl morpholine | NAM | 1 | 12 |
| N-vinyl caprolactam | NVC | 1 | solid |

In the present invention, good results have been obtained using hybrid ink compositions with an anti-kogation agent comprising n-methyl-n-vinyl acetamide (NM-NVAM).

Co-solvent may be desirably included in the compositions. The co-solvent functions as a solvent for the curable materials and ideally has good compatibility with water and has low viscosity. The co-solvent is typically selected from water-soluble organic solvents including alcohols, lactones, thiols, glycols, ethers etc. Glycol ethers function well as co-solvents, as they have good water compatibility, low viscosities and, high boiling points. Further, glycol ethers function as humectants, preventing drying in print head nozzles. Ethylene glycol monobutyl ether (EGMBE) is particularly preferred. Suitable co-solvents include, but are not limited to the following: isopropyl alcohol (IPA) (which gives good jetting), n-methyl pyrrolidone (NMP), methoxy propyl acetate (MPA) (which has a low viscosity), diacetone alcohol (DAA), methoxy propanol (MeOPr), methyl alcohol, ethyl alcohol, methyl lactate, ethyl lactate, 2-pyrrolidone, 1,3-dimethyl-2-imidazolidone, 1-methyl-2-imidazolidinone, 1,4-butanediol, dimethyl sulfoxide (DMSO), lactones, particularly γ-butyrolactone, 2-propiolactone etc., glycol ethers, particularly propylene glycol n-butyl ether, dipropylene glycol, tripropylene glycol, 2-methyl-1,3-propanediol, propylene glycol methyl ether, propylene glycol ethyl ether, dipropylene glycol methyl ether, dipropylene glycol n-butyl ether, tripropylene glycol methyl ether, tripropylene glycol n-butyl ether, propylene glycol methyl ether acetate, dipropylene glycol methyl ether acetate, propylene glycol n-propyl ether acetate, dipropylene glycol n-propyl ether, ethylene glycol n-butyl ether (or ethylene glycol monobutyl ether (EGMBE)), diethylene glycol n-butyl ether, triethylene glycol butyl ether, diethylene glycol methyl ether, triethylene glycol methyl ether.

As noted above, certain curable monomers may also function as co-solvents, e.g. n-vinyl monomer materials such as n-acryloyl morpholine, n-methyl-n-vinyl acetamide and n-vinyl imidazole etc. The presence of such materials, acting e.g. as supporting free-radically curable monomers renders additional co-solvent unnecessary.

The co-solvent is typically present in an amount in the range of up to 40% by weight based on the total weight of the composition.

The composition optionally includes surfactant in small amount (say up to 1% by weight) to improve wetting. Suitable surfactants can be selected having regard to the substrate on which the composition is to be printed. Suitable surfactants include the following:

| Commercial name | Chemical name | Supplier |
|---|---|---|
| BYK 333 | Polyether modified polydimethylsiloxane | BYK Chemie GmbH |
| BYK 381 | Ionic solution of polyacrylic copolymer | BYK Chemie GmbH |
| BYK 320 | Polyether modified polymethylalkylsiloxane | BYK Chemie GmbH |
| BYK 307 | Polyether modified dimethylsiloxane copolymer | BYK Chemie GmbH |
| BYK 302 | Polyether modified dimethylsiloxane copolymer | BYK Chemie GmbH |
| FC 4430 | Fluorosurfactant | 3M |
| FC 4432 | Fluorosurfactant | 3M |
| Dynol 604 | Non-ionic acetylenic glycol-based surfactant | Air Products |
| Surfadone LP 100 | N-alkyl pyrrolidone | ISP |
| Surfynol 2502 | Acetylenic Glycol-Based Surfactants | Air Products |
| Tego Glide 410 | Polyoxylalkyl ($C_2$-$C_4$) polydimethylsiloxane | Degussa AG |
| Tego Glide 100 | Polyether siloxane copolymer | Degussa AG |
| Tego Flow 425 | Polyoxylalkyl ($C_2$-$C_4$) polydimethylsiloxane | Degussa AG |
| Tego Wet KL 245 | Polyether siloxane copolymer | Degussa AG |
| Tego Wet 510 | Non-ionic organic surfactant | Degussa AG |
| Tego Wet 500 | Non-ionic organic surfactant | Degussa AG |
| Tego Wet 270 | Polyether siloxane copolymer | Degussa AG |
| Tego Wet 265 | Polyether siloxane copolymer | Degussa AG |
| Tego Twin 4000 | Siloxane-based gemini surfactant | Degussa AG |
| Easy Wet 20 | An organic polymer blend | ISP |
| Envirogem AD01 | Gemini surfactant | AirProducts |

(BYK, Dynol, Surfadone, Surfynol, Easy Wet, Envirogem and Tego are Trade Marks).

Polyether modified polydimethylsiloxane surfactants e.g. BYK 333 in an amount from 0.2 to 0.8% by weight, are currently favoured.

Suitable cationic photoinitiators for use in the present invention include, but are not limited to, onium salts selected from iodonium, sulfonium, phosphonium, arsonium, azonium, bromonium, or selenonium salts, and the like, and mixtures thereof. Particularly preferred cationic photoinitiators are the diaryliodonium salts of sulphonic and boronic acids and their derivatives, and the triaryl sulfonium salts of sulphonic and boronic acids and their derivatives.

Examples of such materials include, but are not limited to, Cyracure UVI-6976, UVI-6990, UVI-6992 (Dow Chemicals), Irgacure 250, 261 and CGI 552, IGM-C440 (Ciba Specialty Chemicals), RP-2047 and UV9380c (Rhodia Co.), Esacure 1064, 1187 (Lamberti S.p.A) etc. (Cyracure and Irgacure and Esacure are Trade Marks).

Compositions of the present invention desirably comprise from 1 to 20% by weight of the cationic photoinitiator, preferably from 2 to 1.5% by weight, and most preferably from 3 to 8% by weight.

As discussed above, so-called hybrid compositions according to the invention may additionally comprise a free-radical photoinitiator and a thermal initiator, photoinitiator etc. Suitable free-radical initiators are well known to those skilled in the art, as are suitable levels of use (typically from 0.1 to 10% by weight).

Examples of free radical initiators include, but are not limited to: organic peroxides, azo compounds, quinones, benzophenones, nitroso compounds, acryl halides, hydrozones, mercapto compounds, pyrylium compounds, triacrylimidazoles, bisimidazoles, chloroalkylriazines, benzoin ethers, benzil ketals, thioxanthones, and acetophenone derivatives, and mixtures thereof. Specific examples include benzil, methyl o-benzoate, benzoin, benzoin ethyl ether, benzoin isopropyl ether, benzoin isobutyl ether, benzophenone/tertiary amine, acetophenones such as 2,2-diethoxyacetophenone, benzyl methyl ketal, 1-hydroxycyclohexylhenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyl-diphenylphosphine oxide, 2-methyl-1-4(methylthio), phenyl-2-morpholino-1-propanone, bis(2,6-dimethoxybenzoyl)(2,4,4-trimethylpentyl) phosphine oxide, etc. Suitable examples include, but are not limited to: Irgacure 2959, 184, 651, 750, 500, 127, 1800, 819, Darocur TPO, 1173 etc. (Ciba Specialty Chemicals) and Esacure KT046, KIP150, 75LT, KIP IT, KIP 100F, KIP EM, DP 250, KT37, EDB, H—Nu 470, H-Nu 470X, (Lamberti S.p.A) etc. (Irgacure and Darocur are Trade Marks), the thioanthone initiators of: Speedcure DETX, Speedcure ITX, Speedcure CTX, Speedcure CPTX (Lambson Fine Chemicals Ltd.) etc.; and include, but are not limited to the benzophenone initiators of: Speedcure Benzophenone, Speedcure PBZ, Speedcure MBP, Speedcure MBB, Speedcure BMS and Speedcure BEM (Lambson Fine Chemicals Ltd.) etc. (Speedcure is a Trade Mark).

In some embodiments, coinitiators may be used to cure the surface or the bulk of the printed fluid. Examples of suitable coinitiators include, but are not limited to, N-371™ reactive amine coinitiator CN-386™ reactive amine coinitiator, CN-372™ reactive amine coinitiator, CN-384™ reactive amine coinitiator, CN-383™ reactive amine coinitiator, and CN-373™ reactive amine coinitiator, all from Sartomer.

One or more oligomers may be added to the composition. Oligomers may be used to adjust various physical properties of the cured printed film, including chemical resistance, flexibility, weatherability, and shrinkage. Suitable oligomers that may be added to the radiation-curable thermal inkjet ink according to the present disclosure include, but are not limited to: polyesters and acrylics. Suitable amounts include, but are not limited to, amounts in a range of from 0.1 to 3% by weight. CN-2302™ from Sartomer is currently preferred.

The compositions of the invention may be used as is, e.g. to print a clear coating or layer or film on a substrate. Alternatively, the compositions may be used as a vehicle e.g. for carrying a dye in solution or a dispersed pigment in known manner for printing of text or images. The term colorant as used herein may refer to just a colorant, or it may refer to a colorant in combination with, for example, a dispersant of some kind. The colorants used herein are dyes or pigments, more preferably pigments. The colorant may be any colour, but preferably the colorant is cyan, magenta, yellow or black. The colouring agent generally comprises a colorant which may be self-dispersed, polymer-dispersed or surfactant-dispersed. When the colorant is self-dispersed the colorant is synonymous with the colouring agent. Self-dispersed pigment refers to pigments that have been chemically modified with a charge or a polymeric group, wherein the chemical modification aids the pigment in becoming and/or substantially remaining dispersed in a liquid vehicle. When the pigment is a self-dispersing pigment the charging moiety is covalently-linked to the pigment. Surfactant-dispersed pigment refers to pigments that utilize a surfactant dispersant to aid the pigment in becoming and/or substantially remaining dispersed in a liquid vehicle. The colorant maybe chosen from a wide range of conventional colorants (pigments or dyes), preferably pigments. Preferably, the pigment is a white pigment, a black pigment, a blue pigment, a brown pigment, a cyan pigment, a green pigment, a violet pigment, a magenta pigment, a red pigment, or a yellow pigment, or shades or combinations thereof. Suitable classes of coloured pigments include, for example, anthraquinones, phthalocyanine blues, phthalocyanine greens, diazos, monoazos, pyranthrones, perylenes, heterocyclic yellows, quinacridones, diketopyrolopyroles, and (thio)indigoids. Such pigments are commercially available in either powder or press cake form from a number of sources including, BASF Corporation, Engelhard Corporation and Sun Chemical Corporation. Examples of other suitable coloured pigments are described in the Colour Index, 3rd edition (The Society of Dyers and Colourists, 1982).

Preferably, in embodiments of the invention where pigments are used, the pigment particle size is as small as possible to enable a stable dispersion of the particles in the liquid vehicle and to prevent clogging of the ink channels or nozzle when the ink is used in an inkjet printer. Preferred particle average diameters are generally from about 0.001 to about 0.3 micron, although the particle size can be outside this range in specific embodiments. Preferably, at least 70% of the pigment particles should have an average particle diameter of less than about 150 nm for carbon blacks and less than about 150 nm for colour pigments.

When dyes are used in the compositions of the invention, any suitable commercially available dye may be used to impart the desired colour characteristics to the inkjet ink. Suitable anionic and cationic dyes are well known for use in inkjet inks, and include, but are not limited to the examples listed herein. Most inkjet ink dyes are anionic; however, cationic dyes may also be used. Anionic dyes are those in which a negative charge is localized on one atom or spread over the entire molecule. Cationic dyes are those in which a positive charge is localized on one atom or spread over the entire molecule.

In embodiments of the invention where dyes are used, the dye is present in the inkjet ink composition in any effective amount to provide a desired colour. Typically the dye is present in an amount of from about 1 to 5% by weight of the ink composition, and preferably from about 1 to 4% by weight (wherein the amount refers to an amount of dye molecules present in the ink), although the amount can be outside this range. A mixture of dyes in the proportions desired to obtain a specific shade may also be employed. Similarly, in embodiments of the invention where pigments are used, the pigment may be present in the inkjet ink composition in any effective amount. Typically the pigment is present in an amount of from about 1% to 5% by weight of the ink composition and preferably from about 1% to 3% by weight, although the amount can be outside of this range. Where both dyes and pigments are incorporated into the inkjet ink composition, the weight percentage of the combined colorant may be adjusted accordingly.

It will be also appreciated by those skilled in the art that other functional compositions for inkjet printing are also possible for use in the present invention in place of a colorant. Particulate matter such as those suitable for use in preparing conductive regions e.g. Cu, Ag, Au, and alloys of such, and those suitable for use in preparing magnetic regions e.g. Fe and Co, and alloys of such, are also possible for use in the present invention.

In addition, if necessary, additives, such as pH adjusting agents, rust preventives, fungicides, antioxidants, evaporation accelerators, chelating agents, and water-soluble polymers other than the above described components, may be added into inks used in the present invention.

Further details of conventional and optional ingredients for printing inks and their use are given, e.g. in U.S. Pat. No. 6,294,592.

The ink of the present invention is preferably cured by UV irradiation and is suitable for application by thermal inkjet printing. Accordingly, the present invention also provides a method of inkjet printing comprising printing the abovementioned inkjet ink compositions onto a substrate, preferably a flexible non-porous substrate, and irradiating the ink.

EXAMPLES

The invention will now be described, by way of example, with reference to the following non-limiting examples (parts given are by weight) where examples according to the invention are numbered and comparative examples are given letters to identify them.

Preparation of Clear Ink Compositions

The clear inkjet inks of the present invention can be prepared by any process suitable for formulating aqueous- or solvent-based curable materials. Cationically-curable and hybrid inks are prepared by mixing the radiation-curable components: oxetane functional monomer(s), epoxy resin functional monomer(s), allyl and/or vinyl ether monomer(s), and photo-cationic initiator(s), and optional free-radical photoinitiator(s), in a high shear mixing apparatus, such as a commercially-available Dispermat SL-12-C1 bead mill [VMA Getzmann GmbH] (Dispermat is a Trade Mark) operating in recirculating mode at a rate of 4000 rpm for 10 minutes at a temperature of 25° C. The milling media used was 0.1-0.7 μm ceramic beads. Where the composition includes Irgacure 2959, the solid photoinitiator is first dissolved in sufficient quantity of the radiation-curable materials, and then high-shear mixed with the remaining components for 10 minutes.

The resulting clear inks were finally filtered (Whatman GF/B glass microfiber filter, 1 μm) to give a cationically-curable or hybrid ink suitable for thermal inkjet printing.

Viscosity

Viscosity measurements were performed using a Brookfield DV-II+ viscometer operating with a rotational speed of 60 rpm at a temperature of 25° C. Briefly, 17.5 ml of ink was transferred to the chamber, to which a suitable spindle was then lowered into the chamber and left until the temperature stabilized. Measurements were taken every 30, 60, 120 and 300 seconds, until a reproducible viscosity reading could be obtained. [Units: 1 mPa·s=1 cP]

The compositions were printed onto a range of different substrates at 600×600 dpi from a Wolke (Wolke is a Trade Mark) printer or from one of the following Hewlett Packard desktop printers HP 6127 and HP 850 using an HP45A cartridge (with capacity 43 ml ink) and then cured by exposure to UV from a 500 W Fusion Light Hammer 6 system equipped with an 'H' bulb, being conveyed below the UV system at a line speed of 30 m/min. (Fusion Light Hammer 6 is a Trade Mark).

TABLE 1

| Composition | 1 | 2 | 3 | 4 | 5 | 6 | 7 | 8 | 9 | A | B | C | D |
|---|---|---|---|---|---|---|---|---|---|---|---|---|---|
| ERL-4421 | 26.3 | 23.0 | — | — | — | — | — | 30 | 30 | — | — | — | — |
| LMO | — | — | — | 20.0 | 20.0 | 20.0 | — | 5 | — | 30.0 | — | — | — |
| LMDO | — | — | — | — | — | — | 19.5 | — | — | — | — | — | — |
| Cyracure UVR-6105 | — | — | 18.8 | 15 | 7.5 | 20.0 | 8.0 | — | — | 10.0 | — | — | — |
| Cyracure 6110 | — | — | — | — | — | — | — | — | — | — | 20.0 | 38.6 | 24.0 |
| OXT-221 | 12.7 | 8.0 | — | — | — | — | — | — | — | — | — | 16.2 | 12 |
| OXT-212 | — | — | — | 5.0 | — | — | — | — | — | 20 | — | — | — |
| OXT-101 (TMPO) | — | — | 24.0 | 35.0 | 40 | 20 | 43.0 | 35 | 30 | 10 | 26 | — | — |
| Vinyl ether | — | — | — | — | — | 4.0 | — | — | — | — | 10 | — | — |
| TEGDVE | 3.5 | 5.0 | — | — | 7.5 | 5.0 | — | — | — | 22.5 | — | 7.2 | — |
| 1,4 Butanediol vinyl ether | — | — | 6.8 | — | — | — | — | — | 10 | — | — | — | — |
| HBVE | — | — | — | — | — | — | — | — | — | — | — | — | 32 |
| Alkoxylated Polyol 60 | — | 8.0 | — | — | — | — | — | — | — | — | — | — | — |
| CYRACURE UVI-6976 | 5.0 | 5.5 | 10.5 | 5.0 | 5.0 | 8.5 | 5.0 | 10 | 15 | 5.0 | 4 | 3 | 15 |
| Ethylene glycol | 2.0 | — | 2.2 | — | — | 2.0 | — | — | — | — | — | — | 7 |
| Methyl lactate | 30.0 | 30.0 | — | — | — | — | — | — | — | — | — | — | — |
| Ethyl lactate | — | — | — | — | — | 6.0 | — | — | — | — | — | — | — |
| DI Water | 20.0 | 20.0 | 33.4 | 20 | 20 | 4.0 | 24.5 | 20 | 15 | 2.5 | 40 | 35 | 10 |
| n-acryloyl morpholine | — | — | — | — | — | 8.0 | — | — | — | — | — | — | — |
| n-vinyl imidazole | — | — | 4 | — | — | 2.0 | — | — | — | — | — | — | — |
| BYK 333 | 0.5 | 0.5 | 0.3 | — | — | 0.5 | — | — | — | — | — | — | — |

TABLE 1-continued

| Composition | 1 | 2 | 3 | 4 | 5 | 6 | 7 | 8 | 9 | A | B | C | D |
|---|---|---|---|---|---|---|---|---|---|---|---|---|---|
| Viscosity (cP) | 8.06 | 9.5 | 9.92 | 9.2 | 8.72 | 9.7 | 8.3 | 22.0 | 28.8 | 9.5 | PS | PS | PS |
| Print/Cure Quality | 1 | 1 | 1 | 2 | 3 | 2 | 2 | — | — | 3 | — | — | — |
| Jetting Performance | 2 | 2 | 2 | 2 | 2 | 2 | 2 | — | — | 1 | — | — | — |

Print/cure quality
1 = slow, incomplete cure
2 = good
3 = excellent scratch and solvent resistance
Jetting Performance
1 = Poor, overheated
2 = Good
PS = Phase Separated

TABLE 2

| Composition | E | 10 | 11 | 12 |
|---|---|---|---|---|
| ERL-4421 | 2.0 | — | — | — |
| CYRACURE UVR-6105 | — | 3.88 | 4.33 | 4.46 |
| OXT-221 | 2.0 | — | — | — |
| OXT-101 (TMPO) | — | 12.91 | 10.83 | 8.92 |
| TEGDVE | 1.0 | 6.46 | 2.60 | 2.68 |
| 1,4 Butanediol vinyl ether | 45.0 | — | — | — |
| BDVE | 10.0 | — | — | — |
| CYRACURE UVI-6976 | 1.0 | 2.59 | 1.74 | 1.79 |
| DI Water | — | 25.81 | 34.64 | 35.68 |
| THFA (SR 285) | 12.0 | 10.32 | 6.93 | 7.14 |
| DPGDA (SR 508) | 12.0 | 10.32 | 6.93 | 7.14 |
| TMPTA (SR 454) | 6.0 | 5.16 | 3.46 | 3.57 |
| Irgacure 2959 | 5.0 | 3.23 | 2.17 | 2.19 |
| NM-VAM | — | — | 4.33 | 4.46 |
| NAM | — | 19.36 | 19.49 | 15.37 |
| NVI | — | — | 2.60 | 6.65 |
| Scratch resistance | Very good | Excellent | Excellent | Excellent |
| Inkjet performance | Average, occasional loss of the nozzles | Good inkjet performance | Good inkjet performance | Good inkjet performance |
| Viscosity (mPas) | 11 | 9.05 | 6.80 | 6.36 |

The clear inks formulated according to the components in Tables 1 and 2 are in the form of a single-phase radiation-curable composition. Optionally, the formulated inks can also carry a dispersed pigment or dye.

The invention claimed is:

1. A single phase curable composition having a viscosity not exceeding 10 mPas at 25° C. for use in thermal inkjet printing, comprising
    at least one cationically curable material,
    at least one cationic photoinitiator and
    10 to 50 wt % water,
wherein the cationically curable material comprises an oxetane functional monomer, and
wherein either the cationically curable material comprises limonene monoxide and/or limonene dioxide or the composition comprises at least one free radically curable material.

2. A composition according to claim 1, comprising from 10 to 30 wt % water.

3. A composition according to claim 1, wherein the cationically curable material comprises an epoxy functional monomer.

4. A composition according to claim 3, wherein the epoxy functional monomer is a cycloaliphatic epoxy functional monomer.

5. A composition according to claim 1, which has a viscosity of from 1 to 10 mPas at 25° C.

6. A composition according to claim 5, which has a viscosity of from 2 to 10 mPas at 25° C.

7. A composition according to claim 6, which has a viscosity of from 3 to 10 mPas at 25° C.

8. A composition according to claim 7, which has a viscosity of from 5 to 10 mPas at 25° C.

9. A composition according to claim 1, which also comprises a free radical photoinitiator and at least one free radically curable material.

10. A composition according to claim 1, which comprises a vinyl ether.

11. A composition according to claim 1, which comprises a N-vinyl monomer.

12. A composition according to claim 1, comprising at least one acrylate monomer.

13. A composition according to claim 1, which comprises a pigment and/or a dye.

14. A method of inkjet printing a composition according to claim 1 on to a substrate and irradiating the composition after printing on the substrate.

15. A method according to claim 14, which is carried out by thermal inkjet printing.

16. A method according to claim 14 or claim 15, wherein the substrate is non-porous.

17. A single phase curable composition having a viscosity not exceeding 10 mPas at 25° C. for use in thermal inkjet printing, comprising
    at least one cationic curable material,
    at least one cationic photoinitiator and
    water,
wherein the cationically curable material comprises an oxetane functional monomer, and
wherein the cationically curable material comprises limonene monoxide and/or limonene dioxide.

18. A composition according to claim 17, which comprises from 2 to 50 wt % water.

19. A composition according to claim 17 which comprises from 5 to 40 wt % water.

20. A composition according to claim 17, which has a viscosity of from 1 to 10 mPas at 25° C.

21. A composition according to claim 17, which also comprises a free radical photoinitiator and at least one free radically curable material.

22. A composition according to claim 17, which comprises a vinyl ether.

23. A composition according to claim 17, comprising at least one acrylate monomer.

24. A composition according to claim 17, which comprises a pigment and/or a dye.

* * * * *